United States Patent [19]

Eichinger et al.

[11] 4,287,973

[45] Sep. 8, 1981

[54] SHIFTABLE FRICTION CLUTCH IN PARTICULAR FOR GEAR DRIVES

[75] Inventors: Johann Eichinger, Vaterstetten; Gert Burzlauer, Anzing, both of Fed. Rep. of Germany

[73] Assignee: Carl Hurth Maschinen- und Zahnradfabrik GmbH & Co., Munich, Fed. Rep. of Germany

[21] Appl. No.: 100,070

[22] Filed: Dec. 4, 1979

[30] Foreign Application Priority Data

Dec. 21, 1978 [DE] Fed. Rep. of Germany ....... 2855318

[51] Int. Cl.³ .................. F16D 21/06; F16D 13/42
[52] U.S. Cl. .................... 192/54; 192/48.91; 192/70.23; 192/93 A
[58] Field of Search .......... 192/48.91, 54, 70.23, 192/93 A; 188/72.2, 72.7

[56] References Cited

U.S. PATENT DOCUMENTS

| | | | |
|---|---|---|---|
| 1,683,715 | 9/1928 | Erban | 192/93 A X |
| 2,081,824 | 5/1937 | Lambert | 192/54 X |
| 3,034,365 | 5/1962 | Stieber | 188/72.2 X |
| 3,203,525 | 8/1965 | Herbst | 192/93 A X |
| 3,703,226 | 11/1972 | Strehler | 192/54 |
| 4,118,996 | 10/1978 | Eichinger | 192/54 X |

FOREIGN PATENT DOCUMENTS 2008694 6/1979 United Kingdom ................. 192/54

*Primary Examiner*—Allan D. Herrmann
*Attorney, Agent, or Firm*—Blanchard, Flynn, Thiel, Boutell & Tanis

[57] ABSTRACT

A friction clutch including interleaved compressible friction plates or overlapping conical rings and selectively operable structure effecting engagement thereof. One aspect of the invention relates to the structure for utilizing torque generated between the parts to be clutched for providing the compression force to be applied to the plates or the cone rings. Roller and ramp structure is provided between driving and driven parts responding to torque initially applied to the driving member for generating an axial force which is then applied to the clutch pack compressing structure. The roller has an elongated structure which will permit it to first roll about an axis perpendicular to the axis of rotation of the friction clutch and subsequently slide along its axial length. This structure will prevent or at least considerably reduce the power surges following a complete clutching operation.

9 Claims, 7 Drawing Figures

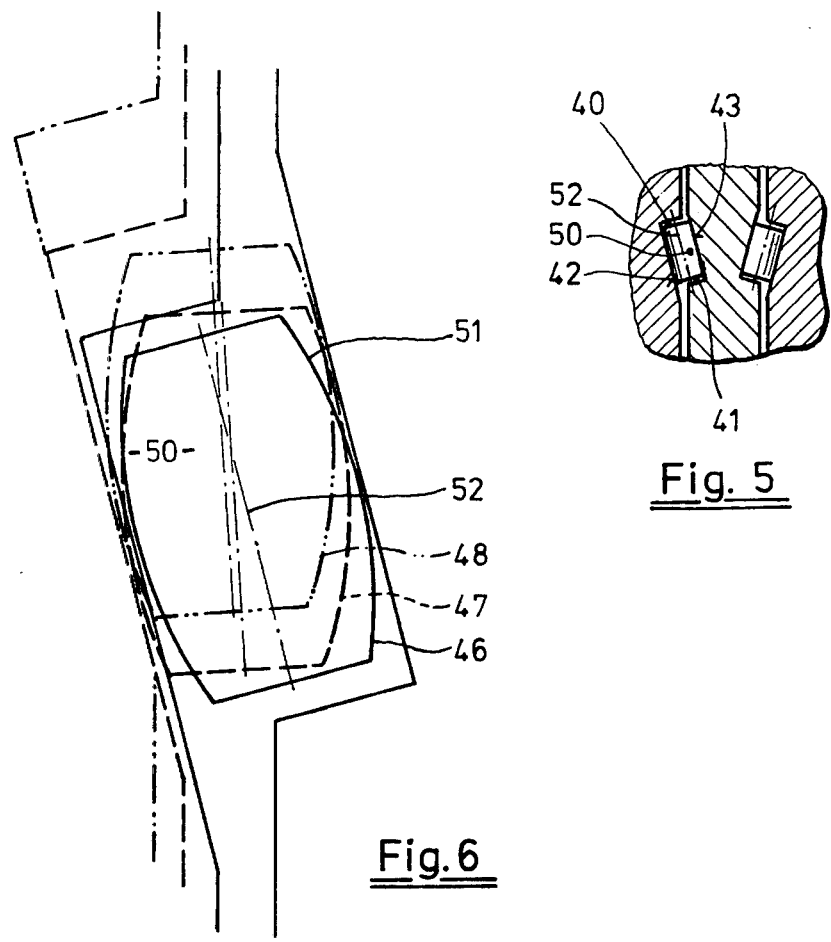
Fig. 5
Fig. 6
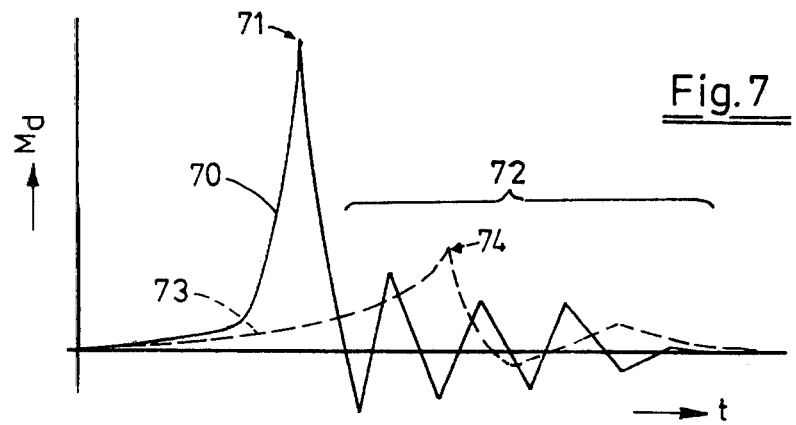
Fig. 7

SHIFTABLE FRICTION CLUTCH IN PARTICULAR FOR GEAR DRIVES

FIELD OF THE INVENTION

This invention relates to a shiftable friction clutch, in particular for gear drives, comprising a carrier which is supported for axial movement on the shaft to be coupled and comprising at least one axially movable friction ring, which belongs to a first clutch half and which cooperates through clutch friction surfaces with a second clutch half and which for producing the contact pressure is supported on the shaft to be coupled by means of inclined surfaces which are arranged on the axial surface which does not face the clutch surfaces and which are inclined with respect to the plane of rotation.

BACKGROUND OF THE INVENTION

A shiftable friction clutch of this type is known in which rolling members are arranged between the inclined surfaces which are provided on the friction ring and the inclined surfaces which are provided on the shaft (German Pat. No. 20 33 772). In such a clutch, the shifting operation is initiated only by a relatively small force, the further shifting operation being carried out automatically until completion without that one would have to or could controllingly interfere externally in any manner. In other words: the shifting operation is only started externally, the further course occurs uncontrollably. Here exists—in contrast to a hydraulically or pneumatically shifted clutch for example—no possibility to reduce or even to avoid the impacts or impulses which can often be observed at the end of a shifting operation as a consequence of a sudden rise in the transmitted torque. In some cases this so-called engaging force or surge can be accepted, however, it is many times felt as interfering, for example, in drives for sport and recreational boats.

Other types of known structures are disclosed in U.S. Pat. Nos. 3,203,525 and 3,703,226 and Application Ser. No. 041,923, filed May 24, 1979 and assigned to the same assignee as is the present invention.

Therefore, the basic purpose of the invention is to prevent or at least considerably reduce in a friction clutch which is operated through a servo force the impact or surges which occur at the end of the engaging operation. As few as possible structural changes are thereby required in the conventional types of construction of clutches.

SUMMARY OF THE INVENTION

The purpose is inventively attained by arranging sliding members in place of the conventional rolling members between the inclined surfaces of the friction ring and the shaft. We discovered that a slight increase in the friction value which exists between the friction surfaces, as is provided with a sliding friction relative to a rolling friction under certain conditions, is sufficient to permit the engaging operation to run off just enough slower that the time required for engagement is still acceptable, however, the shifting impact or surge is reduced to an acceptable value. At least approximately cylindrical members or rollers are suited as sliding members, which are installed so that their axes are directed parallel with respect to the respective inclined surfaces. Therewith the cylindrical members rest theoretically only on a very narrow surface along their surface line on the inclined surfaces. Due to deviations caused through the manufacturing process, a simultaneous resting of a member on both associated inclined surfaces is, however, hardly possible. Therefore, the utilization of rollers having a slightly spherical shape is advantageous. Such rollers are often used in roller bearings, they are thus structural parts which are inexpensively obtained for the inventive construction of a friction clutch. Aside from this, spherical rollers have still a further advantage for the invention: At the start of the shifting operation, when the friction ring starts to rotate relative with respect to the shaft, a stick-slip-effect is avoided between the rollers and the inclined surfaces. The rollers first carry out a very small rolling movement by first rolling along the inclined surfaces. corresponding with their spherical surface over a small stretch about an axis which is directed transversely with respect to their geometric axis and perpendicular with respect to the axis of rotation of the shaft, until this rolling transforms into the desired sliding.

BRIEF DESCRIPTION OF THE DRAWINGS

The invention is discussed with reference to FIGS. 1 to 7, in which:

FIG. 5 is a partial cross-sectional view of the sliding members which lie between the inclined surfaces;

FIG. 6 illustrates in an enlarged scale the sequence of movement of the sliding members; and FIG. 7 illustrates a diagram of the engaging force following the point in time where engagement occurs in a conventional and in the inventive clutch.

DETAILED DESCRIPTION

Figure 1:
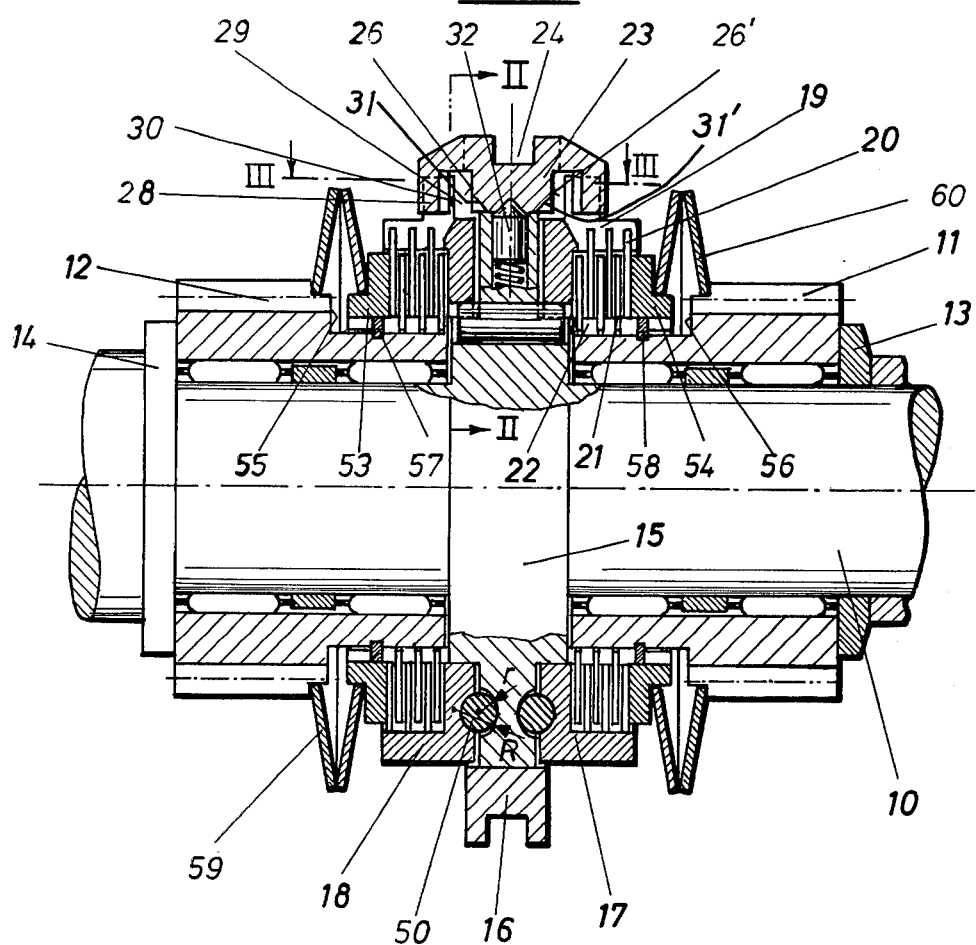
FIG. 1 is a longitudinal cross-sectional view of a clutch embodying the invention.

FIG. 1 illustrates as an exemplary embodiment a double clutch. A shaft 10 is to be selectively connected with gears 11,12 through the clutch, which gears are rotatably supported on the shaft and are held axially fixed by suitable means, for example by disks 13 or by an annular shoulder 14. Between the two gears, the shaft is provided with a radially extending flange or the like, which serves as a carrier 15. The carrier 15 can also be mounted on the shaft and can be secured there. A shift collar 16 is guided longitudinally movably on the carrier 15. The shift collar is secured against rotation on the carrier by not illustrated conventional means. A pair of friction rings 17 and 18 is provided, with each being rotatably centered on opposite axial sides of the carrier. The outside diameter of the friction rings corresponds with the outside diameter of the carrier. The friction rings are provided with recesses 19 for receiving the external teeth of the outer clutch plates 20 therein. The outer clutch plates cooperate with the inner clutch plates 21, which engage through internal teeth corresponding external teeth 22 on the gears 11,12. The clutch packs are supported at their axially outwardly facing ends against pressure plates 53 and 54.

The friction rings 17,18 and the carrier 15 are provided with milled recesses 40,41 on the sides thereof which face one another, which recesses each have an inclined surface 42 and 43, respectively (FIG. 5). Sliding members 50 are inserted therebetween, which will be discussed in more detail below.

Figure 3:
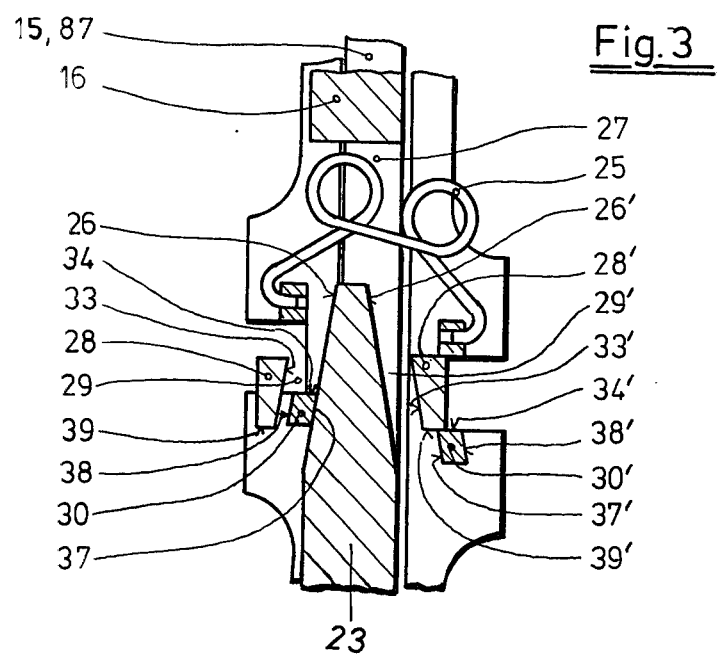
FIG. 3 is a cross-sectional view taken along the line III—III of FIG. 1 and illustrates schematically a shifting phase.

The friction rings 17 and 18 are urged by one or more return springs 25 (FIG. 3) toward the carrier, which are arranged outside on the periphery of the friction ring and are constructed as coiled flat springs, so-called hairpin or torsion springs. To support the springs, projections having openings therein are provided on the periphery of the friction rings and receive the ends of the springs 25 therein.

The shift collar 16 consists of a sleeve member 23, which is provided outside on the periphery with an annular groove for a shifting fork (not illustrated). The sleeve member has on the inner surface thereof adjacent the axial sides thereof two inclined surface which converge toward the center and which are called first pressure surfaces 26,26'. When the inclined surfaces, for example 42, on the friction members, which serve as a ramp for the sliding members, are inclined in a certain peripheral direction, enlarging in depth the milled recess 40,41, then the first pressure surfaces 26,26' converge in the same direction toward a central plane (plane of rotation) of the sleeve member. Openings 27 follow the part of the sleeve member forming the first pressure surfaces and receive the mentioned return springs 25 therein. Blockers 28,28' are provided on the sleeve member 23 and at an axial spacing from the first pressure surfaces 26,26'. The blockers have on the side facing the first pressure surfaces second pressure surfaces 33,33' extending parallel to the first pressure surfaces. The sleeve member 23 and the blockers thus form inwardly located gaps 29,29'. Teeth 30,30' are provided on the periphery of the friction members, which teeth are provided on the side facing the sleeve member with a counter-pressure surface 37,37' extending parallel to the earlier mentioned first pressure surfaces on the sleeve member. On the opposite side, each tooth 30,30' has a counterflank 38,38' extending parallel with respect to the respectively facing second pressure surfaces 33,33' on the blockers. The gaps 29,29' are wider in axial direction than the width of the teeth 30,30'. The teeth have stop flanks 34,34' on the side which faces the blockers approximately in a plane which is placed through the axis of rotation and are directed approximately at a right angle with respect to the plane of rotation (direction of rotation). On the side which faces the teeth, the blockers 28,28' have a stop surface 39,39' extending approximately at a right angle with respect to the plane of rotation. Upon engaging the clutch by moving the sleeve member, the first pressure surface, for example 26, is urged into engagement with the counter-pressure surface, for example 37. As a result, the friction ring is moved toward the friction surfaces (plates), which starts the torque transmission. The sliding members 50 which slide on the inclined surfaces 42,43 increase the transmittable torque. Disengagement is accomplished by the countersurfaces of the sleeve member 23 pressure onto the counterflank of the friction ring. Through the cooperation of the stop surfaces 39,39' with the stop flanks 34,34', an unintentional engagement of the disengaged friction ring is prevented.

A locating pin 32 which is biassed by a spring is guided for radial movement in the carrier 15. A fitting notch is provided in the center of the sleeve member 23 for locking the sleeve member in the disengaged condition (neutral position). On the axially facing sides of the sleeve member 23, there are provided locking notches or inclined surfaces 31,31' for fixing the two engaging conditions, which locking notches are open toward the side, namely thus are half locking notches or sloped surfaces. The locking pin and the inclined surfaces on the axial sides of the sleeve member support the engaging operation. The pressure plates 53,54 are arranged with an axial play axially with respect to the inner and outer clutch plates. The amount of play is limited on the one side by a shoulder 55,56 which is formed on the gears 11,12 and on the other side by a snap ring 57,58. The pressure plates are biassed by Beleville springs 59,60 in the sense of an engagement. The snap rings are arranged such that the clutch plates are not compressed by the pressure plates when the friction rings 17,18 are in the disengagement condition.

Rollers which can be purchased inexpensively are used as the already mentioned sliding members 50, as they are usually used in roller bearings. The rollers are placed into the milled recesses 40,41 such that their axes 52 extend in the uncoupled or disengaged condition parallel with respect to the sloped surfaces 42,43. This is achieved in a simple manner by the radius R of the recesses being larger than the radius r of the rollers. Furthermore with this it is assured that the rollers with the adjoining recesses have only small contact surfaces. Theoretically, there exists only a line contact which, however, because of the unavoidable manufacturing tolerances cannot be achieved. Therefore, rollers having a slightly convex or spherical surface 51 are used. Thus a satisfactory contact over a small surface area is assured.

If now for the engagement a friction ring and the carrier are moved against one another, the rollers 50 first carry out a vary small rolling movement. They thereby roll with their spherical surface line along the inclined surfaces 42,43, which are thereby urged apart at a minimum. Starting at a certain point, the rolling movement transfers over into a sliding movement: the rollers 50 now slide on the flat inclined surfaces 42,43, which thus serve as ramps and thereby urge the respective friction ring 17,18 away from the carrier 15 and compress the aforementioned clutch plates 20,21 together. As a result, the gears are coupled to the shaft through the clutch plates, the respective friction ring, the respective sliding members and the carrier.

FIG. 6 illustrates the sequence of movement between the sliding member 50, carrier 15 and friction ring 17,18 in three stages which are identified by the reference numerals 46,47 and 48. The parts are illustrated enlarged and distorted in the interest of clarity. Reference numeral 46 identifies the initial position (full lines) and corresponds to the illustration in FIG. 3, reference numeral 47 identifies the end of the rolling (broken lines) and reference numeral 48 identifies a condition during sliding (dash-dotted lines). In a so designed clutch, the impact which occurs at the end of the shifting operation is substantially reduced, as it is illustrated in FIG. 7. The curve 70 shows the change of the torque $M_d$ transmitted by the clutch, which change is controlling for impacts occurring during the engaging time t in a conventional clutch having rolling members between the inclined surfaces. The peak impulses can clearly be recognized at reference numeral 71 and the subsequent dropping off and rising at reference numeral 72. Compared with this, the curve 73 shows the same operation in a clutch according to the invention under the same conditions. Here the peak impulse 74 is substantially lower, namely the noticeable shifting impact is substantially less. Since here too the subsequent drop and rise is almost totally missing, the otherwise common shifting noise is also substantially nonexistent.

Figure 2:
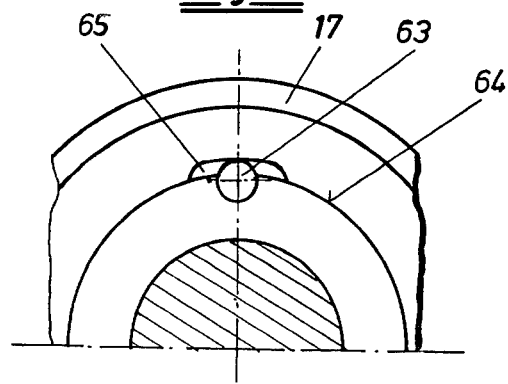
FIG. 2 is a cross-sectional view of the clutch taken along the line II—II of FIG. 1.

One or several pins 63 (FIG. 2) are further provided in the carrier 15, so that their axes extend parallel with the axis of rotation. Furthermore, the pins are arranged such that half of their periphery lies in the central portion 64 of the friction ring or rings, while the other part projects out therefrom. The friction ring or the friction rings are provided with a recess 65 on their periphery which faces the central portion 64, which recess embraces the pin or the pins. The pin or the pins operate as stops for the respective friction ring, which can thus rotate only over a limited angle. Since during clutch engagement the rolling members run onto the ramps, the friction ring requires a movability in a circumferential direction to permit its axial movement. Since on the other hand, the pin limits this movability as a stop, it also serves as a stop for the axial movement. During clutch engagement the friction ring does not urge the clutch plates against a fixed end plate but against the resilient pressure plate 53 or 54. The maximum friction force and thus the maximum transmittable torque depends thus on the tension of the spring 59 or 60. An exceeding of the predetermined overlaod moment through impacts is not possible in the described clutch. Due to the indicated arrangement, the spring 59,60 or the springs cannot in a disengaged condition act onto the clutch plates because an axial mounting on both sides thereof is provided which limits the spring path in direction toward the clutch plates.

Figure 4:
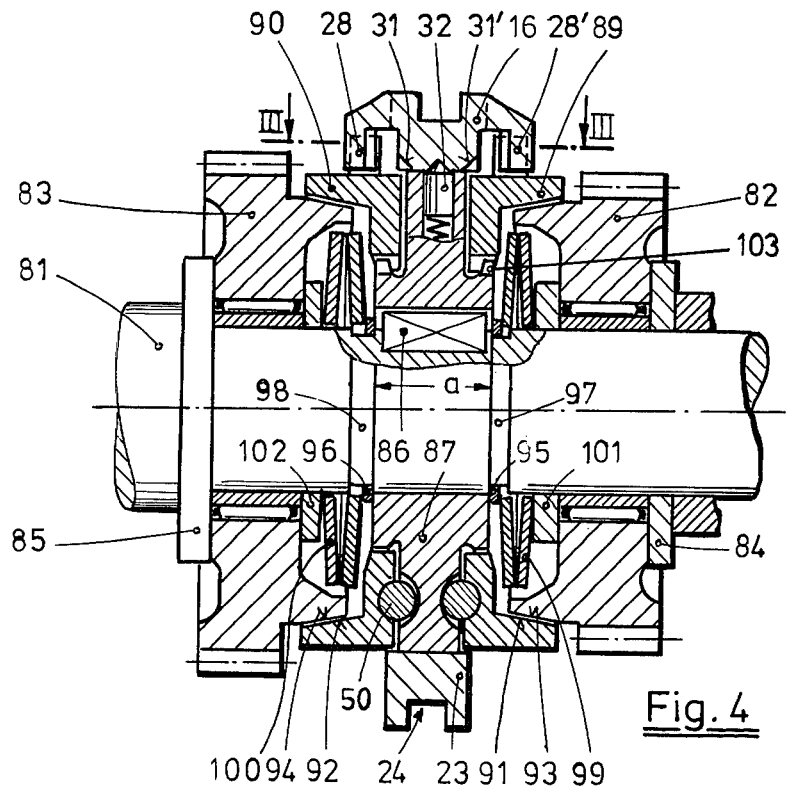
FIG. 4 is a longitudinal cross-sectional view of a different embodiment of a clutch embodying the invention.

The invention is not limited to the described construction of a clutch. It can among others also be applied to a type of construction of a double clutch having conical friction surfaces and which is shown in FIG. 4. This clutch selectively connects a shaft 81 with gears 82,83, which are rotatably supported on the shaft and are held axially by suitable means, for example by disks 84 or a radially extending shoulder 85. A carrier 87 is mounted between the two gears with at least one key 86, fixed against rotation, however, axially movably, which carrier will yet be discussed in more detail. A shift collar 16 is guided longitudinally movably on the carrier. The shift collar is secured against rotation on the carrier by not illustrated conventional means. On both axially facing sides of the carrier there is a friction ring (cone ring 89,90) rotatably centered. The outside diameter of the cone rings corresponds approximately with the outside diameter of the carrier. The cone rings are each provided with an inner conical surface 91,92, which cooperates with an external conical surface 93,94 on the gears 82,83.

The cone rings 89,90 and the carrier 87 are provided on the sides which face one another with the same recesses 40,41 (FIG. 5) as in the preceding embodiment and which have an inclined surface 42,43. Between the inclined surfaces sliding members 50 are inserted, as in the example according to FIG. 1. Therefore, the operation of the sliding members is valid for the entire shifting mechanism and that which has been stated with respect to the first example and corresponding parts are identified in FIG. 4 with the same reference numerals as the parts in the FIGS. 1, 3 and 5. The only difference is that in place of the clutch plates 20,21 the inner conical surfaces 91,92 and the outer conical surfaces 93,94 are urged against one another.

The carrier 87, as already mentioned, is mounted axially movably on the shaft 81. The carrier is held in its neutral position by two snap rings 95,96 which are placed with a small amount of radial play in annular grooves 97,98 on the shaft 81. The grooves are wider than the width of the snap rings and the distance a of their lateral borders which face the carrier corresponds substantially with the width of the carrier. Beleville springs 99,100 engage the side of the snap rings remote from the carrier and are supported on a disk 101,102 which restricts an axial movement of the gear 82,83. The operation of the Beleville springs corresponds with the one of the Beleville springs 59,60 in the first example. It is further mentioned that in this exemplary embodiment, in place of the radially arranged pins, teeth 103 are provided on the carrier and project into corresponding recesses in the cone rings and the circumferentially facing surfaces will become engaged.

The invention is furthermore not limited to the use of sliding members in the described form of rollers. Of course, other forms can also be used which bring about the corresponding result.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a shiftable friction clutch for gear drives including a shaft, a carrier having inclined first surfaces thereon, a collar which surrounds and is supported axially movably with respect to said shaft, and first and second clutch halves having cooperable friction surfaces, said first clutch half having at least one friction ring which is axially movable with respect to said shaft and has second surfaces which are arranged on an axially facing surface thereof facing away from said clutch friction surfaces and are inclined with respect to the plane of rotation of said friction ring, said first and second surfaces opposing one another, the improvement comprising at least one sliding member provided between said second inclined surfaces on said friction ring and said first inclined surfaces on said carrier.

2. The shiftable friction clutch according to claim 1, wherein said sliding members are rollers, the axes of which extend parallel to said inclined surfaces.

3. The shiftable friction clutch according to claim 2, wherein the surfaces of said rollers are slightly spherical.

4. The shiftable friction clutch according to claim 1, 2 or 3, including a gear rotatably supported on said shaft and drivingly coupled to said second clutch half, and including a spring arranged between said second clutch half and said gear for urging said second clutch half toward said first clutch half.

5. The shiftable friction clutch according to claim 4, including first and second stop means for limiting axial movement of said second clutch half toward and away from, respectively, said first clutch half.

6. The shiftable friction clutch according to claim 5, including third stop means for limiting both an axial as well as an angular movement of said friction ring.

7. The shiftable friction clutch according to claim 1, 2 or 3, wherein said carrier is axially movable with respect to said shaft and said coller is supported axially movably on said carrier, and including spring means arranged on the side of said carrier remote from said clutch friction surfaces and cooperable with said carrier for resisting axial movement of said carrier away from said second clutch half.

8. The shiftable friction clutch according to claim 7, including first stop means for limiting axial movement of said carrier toward said second clutch half in response to the urging of said spring means and including second stop means for limiting axial movement of said carrier away from said second clutch half.

9. The shiftable friction clutch according to claim 8, including third stop means for limiting both an axial as well as an angular movement of said friction ring.

* * * * *